US010442978B2

(12) United States Patent
Al-Nakhli et al.

(10) Patent No.: US 10,442,978 B2
(45) Date of Patent: *Oct. 15, 2019

(54) COMPOSITIONS AND METHODS FOR ENHANCED FRACTURE CLEANUP USING REDOX TREATMENT

(71) Applicant: Saudi Arabian Oil Company, Dhahran (SA)

(72) Inventors: Ayman R. Al-Nakhli, Dhahran (SA); Hazim H. Abass, Dhahran (SA); Ahmad S. Al-Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,393

(22) Filed: Feb. 22, 2019

(65) Prior Publication Data
US 2019/0185739 A1   Jun. 20, 2019

Related U.S. Application Data

(63) Continuation of application No. 16/039,966, filed on Jul. 19, 2018, now Pat. No. 10,308,862, which is a (Continued)

(51) Int. Cl.
E21B 37/00        (2006.01)
E21B 36/00        (2006.01)
(Continued)

(52) U.S. Cl.
CPC .............. C09K 8/536 (2013.01); C09K 8/524 (2013.01); C09K 8/528 (2013.01); C09K 8/532 (2013.01);
(Continued)

(58) Field of Classification Search
CPC .... E21B 37/00; E21B 43/2405; E21B 43/267; E21B 43/26; E21B 8/80; E21B 8/0665; C09K 8/62; C09K 8/52
See application file for complete search history.

(56) References Cited

U.S. PATENT DOCUMENTS 1,819,055 A   8/1931   Jan et al.
1,990,969 A   2/1935   Wilson
(Continued)

FOREIGN PATENT DOCUMENTS

CN   101323780 A   12/2008
CN   101839123 A    9/2010
(Continued)

OTHER PUBLICATIONS

Ai-Nakhli, Chemically-Induced Pressure Pulse to Increase Stimulated Reservoir Volume in Unconventional Reservoirs, Unconventional Resources Technology Conference, Denver, CO, Aug. 25-27, 2014.
(Continued)

Primary Examiner — Silvana C Runyan
(74) Attorney, Agent, or Firm — Bracewell LLP; Constance G. Rhebergen; Kevin R. Tamm

(57) ABSTRACT

A cleanup fluid for reducing a viscosity of a residual viscous material in fractures of a hydrocarbon-bearing formation. The cleanup fluid includes an exothermic reaction component operable to generate heat, where the heat is operable to reduce a viscosity of the residual viscous material to create a reduced viscosity material, the reduced viscosity material operable to flow from the fractures.

18 Claims, 11 Drawing Sheets

Related U.S. Application Data continuation-in-part of application No. 15/205,994, filed on Jul. 8, 2016, now Pat. No. 10,053,614, which is a continuation-in-part of application No. 14/689,901, filed on Apr. 17, 2015, now Pat. No. 9,701,894.

(60) Provisional application No. 61/980,664, filed on Apr. 17, 2014.

(51) Int. Cl.
    *C09K 8/536* (2006.01)
    *C09K 8/528* (2006.01)
    *C09K 8/532* (2006.01)
    *C09K 8/524* (2006.01)
    *E21B 43/267* (2006.01)

(52) U.S. Cl.
    CPC ............ *E21B 36/008* (2013.01); *E21B 37/00* (2013.01); *C09K 2208/32* (2013.01); *E21B 43/267* (2013.01)

(56) References Cited

U.S. PATENT DOCUMENTS

| | | | |
|---|---|---|---|
| 2,094,479 A | 9/1937 | Vandergrift |
| 2,288,556 A | 6/1942 | Vollmer |
| 2,466,674 A | 4/1949 | Mullady |
| 2,606,813 A | 8/1952 | Kahr |
| 2,699,213 A | 1/1955 | Cardwell et al. |
| 2,885,004 A | 5/1959 | Perry |
| 3,025,911 A | 3/1962 | Bergman |
| 3,354,954 A | 11/1967 | Buxton |
| 3,385,360 A | 5/1968 | Smith |
| 3,405,761 A | 10/1968 | Parker |
| 3,476,183 A | 11/1969 | Haynes, Jr. et al. |
| 3,483,923 A | 12/1969 | Darley |
| 3,543,856 A | 12/1970 | Knox et al. |
| 3,568,772 A | 3/1971 | Gogarty et al. |
| 3,576,596 A | 4/1971 | Kranc et al. |
| 3,707,192 A | 12/1972 | Goins, Jr. et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,864,451 A | 2/1975 | Lee et al. |
| 4,056,146 A | 11/1977 | Hall |
| 4,085,799 A | 4/1978 | Bousaid et al. |
| 4,136,739 A | 1/1979 | Salathiel et al. |
| 4,158,042 A | 6/1979 | Deutschman |
| 4,178,993 A | 12/1979 | Richardson et al. |
| 4,210,628 A | 7/1980 | Ninomiya et al. |
| 4,219,083 A | 8/1980 | Richardson et al. |
| 4,232,740 A | 11/1980 | Park |
| 4,232,741 A | 11/1980 | Richardson et al. |
| 4,291,765 A | 9/1981 | Gilchrist et al. |
| 4,330,037 A | 5/1982 | Richardson et al. |
| 4,399,868 A | 8/1983 | Richardson et al. |
| 4,410,041 A | 10/1983 | Davies et al. |
| 4,414,118 A | 11/1983 | Murphey |
| 4,454,918 A | 6/1984 | Richardson et al. |
| 4,475,595 A | 10/1984 | Watkins et al. |
| 4,482,016 A | 11/1984 | Richardson |
| 4,485,007 A | 11/1984 | Tam et al. |
| 4,491,180 A | 1/1985 | Brown et al. |
| 4,518,040 A | 5/1985 | Middleton |
| 4,572,297 A | 2/1986 | Thigpen et al. |
| 4,615,391 A | 10/1986 | Garthoffner |
| 4,703,803 A | 11/1987 | Blumer |
| 4,832,123 A | 5/1989 | Abou-Sayed et al. |
| 4,842,073 A | 6/1989 | Himes et al. |
| 4,846,277 A | 7/1989 | Khalil et al. |
| 4,865,826 A | 9/1989 | Carnell et al. |
| 4,898,750 A | 2/1990 | Friedman et al. |
| 4,919,209 A | 4/1990 | King |
| 5,082,058 A | 1/1992 | Blumer |
| 5,087,350 A | 2/1992 | Paris-Marcano |
| 5,152,906 A | 10/1992 | Aften et al. |
| 5,183,581 A | 2/1993 | Khalil et al. |
| 5,197,544 A | 3/1993 | Himes |
| 5,209,295 A | 5/1993 | Hernandez et al. |
| 5,342,530 A | 8/1994 | Aften et al. |
| 5,358,565 A | 10/1994 | Shu |
| 5,375,660 A | 12/1994 | Wehunt |
| 5,411,093 A | 5/1995 | Jennings, Jr. |
| 5,411,094 A | 5/1995 | Northrop |
| 5,639,313 A | 6/1997 | Khalil |
| 5,958,224 A | 9/1999 | Ho et al. |
| 6,035,933 A | 3/2000 | Khalil et al. |
| 6,277,271 B1 | 8/2001 | Kocal |
| 6,500,219 B1 | 12/2002 | Gunnerman |
| 6,554,071 B1 | 4/2003 | Reddy et al. |
| 6,662,874 B2 | 12/2003 | Surjaatmadja et al. |
| 6,722,434 B2 | 4/2004 | Reddy et al. |
| 6,827,845 B2 | 12/2004 | Gong et al. |
| 6,881,325 B2 | 4/2005 | Morris et al. |
| 6,986,392 B2 | 1/2006 | Chatterji et al. |
| 6,992,048 B2 | 1/2006 | Reddy et al. |
| 7,029,639 B2 | 4/2006 | Yasutake et al. |
| 7,059,414 B2 | 6/2006 | Rae et al. |
| 7,066,260 B2 | 6/2006 | Sullivan et al. |
| 7,153,434 B1 | 12/2006 | Dennis |
| 7,328,746 B2 | 2/2008 | Al-Taq et al. |
| 7,540,328 B2 | 6/2009 | Brown et al. |
| 7,589,050 B2 | 9/2009 | Frenier et al. |
| 7,624,743 B2 | 12/2009 | Sarkar et al. |
| 7,686,084 B2 | 3/2010 | Reddy et al. |
| 7,779,915 B2 | 8/2010 | Hutchins et al. |
| 7,947,629 B2 | 5/2011 | Fuller |
| 8,096,361 B2 | 1/2012 | Willberg |
| 8,216,344 B2 | 7/2012 | Degenstein et al. |
| 8,282,715 B1 | 10/2012 | Degenstein et al. |
| 8,962,536 B2 | 2/2015 | Winslow et al. |
| 2003/0092581 A1 | 5/2003 | Crews |
| 2003/0221831 A1 | 12/2003 | Reddy et al. |
| 2005/0000694 A1 | 1/2005 | Dalrymple et al. |
| 2005/0215439 A1 | 9/2005 | Blair |
| 2006/0144591 A1 | 7/2006 | Gonzalez et al. |
| 2006/0154814 A1 | 7/2006 | Zanibelli et al. |
| 2006/0229212 A1 | 10/2006 | Willberg |
| 2006/0258541 A1 | 11/2006 | Crews |
| 2008/0066784 A1 | 3/2008 | Sarkar et al. |
| 2008/0069961 A1* | 3/2008 | Sarkar ................... C09K 8/524 427/384 |
| 2008/0119374 A1 | 5/2008 | Willberg et al. |
| 2008/0121395 A1 | 5/2008 | Reddy et al. |
| 2008/0190607 A1 | 8/2008 | Minnich et al. |
| 2008/0190610 A1 | 8/2008 | Barmatov et al. |
| 2008/0289828 A1 | 11/2008 | Hutchins et al. |
| 2008/0318812 A1 | 12/2008 | Kakadjian, Sr. et al. |
| 2009/0098467 A1 | 4/2009 | Lowe et al. |
| 2010/0056399 A1 | 3/2010 | Berkland et al. |
| 2010/0170453 A1 | 7/2010 | Betzer-Zilevitch |
| 2010/0288499 A1 | 11/2010 | Al-Dhafeeri et al. |
| 2011/0030958 A1 | 2/2011 | Fedorov et al. |
| 2011/0203797 A1 | 8/2011 | Alexandrov et al. |
| 2011/0220360 A1 | 9/2011 | Lindvig et al. |
| 2012/0211225 A1 | 8/2012 | Kostrov et al. |
| 2012/0305255 A1* | 12/2012 | Zavolzhskiy ........... E21B 43/26 166/308.1 |
| 2013/0123151 A1 | 5/2013 | Crews |
| 2013/0126169 A1 | 5/2013 | Al-Nakhli et al. |
| 2013/0126175 A1 | 5/2013 | Al-Mulhem et al. |
| 2013/0180720 A1 | 7/2013 | Al-Dahlan et al. |
| 2014/0069644 A1 | 3/2014 | Reddy et al. |
| 2014/0090839 A1 | 4/2014 | Al-Nakhli et al. |
| 2014/0116701 A1 | 5/2014 | Tang |
| 2014/0144632 A1 | 5/2014 | Zavolzhski et al. |
| 2014/0290951 A1 | 10/2014 | Al-Taq et al. |

(56) References Cited

U.S. PATENT DOCUMENTS

| | | |
|---|---|---|
| 2015/0300142 A1 | 10/2015 | Al-Nakhli et al. |
| 2015/0300143 A1 | 10/2015 | Al-Nakhli et al. |

FOREIGN PATENT DOCUMENTS

| | | |
|---|---|---|
| EP | 0654582 A1 | 5/1995 |
| EP | 0909873 A2 | 4/1999 |
| JP | 2001019984 A | 1/2001 |
| RU | 2100583 C1 | 12/1997 |
| RU | 2126084 C1 | 2/1999 |
| SU | 1677260 A1 | 9/1991 |
| WO | 0037777 A1 | 6/2000 |
| WO | 2006131895 A1 | 12/2006 |
| WO | 2008032067 A1 | 3/2008 |
| WO | 2009009370 A1 | 1/2009 |
| WO | 2009070561 A1 | 6/2009 |
| WO | 2010046618 A1 | 4/2010 |
| WO | 2010047612 A1 | 4/2010 |
| WO | 2012012224 A1 | 1/2012 |
| WO | 2012025150 A1 | 3/2012 |
| WO | 2012082402 A2 | 6/2012 |
| WO | 2013078306 A1 | 5/2013 |

OTHER PUBLICATIONS

Anning Zhou et al., Deep Desulfurization of Diesel Fuels by Selective Adsorption with Activated Carbons, American Chemical Society, Washington, DC, vol. 49, No. 3, Jul. 1, 2004, pp. 329-332.

Antonio Chica, "Catalytic Oxidative Desulfurization (ODS) of Diesel Fuel on a Continuous Fixed-Bed Reactor," Journal of Catalysis, vol. 242, 2006, pp. 229-308.

Ashton, J.P., et al., "In-Situ Heat System Stimulates Paraffinic-Crude Producers in Gulf of Mexico," SPE 15660, SPE Production Engineering, May 1989, pp. 157-160, vol. 4, No. 2, Society of Petroleum Engineers.

Cheng Yun-Fu, Preparation and Field Uses of Heat Generating Hydrofracturing Fluids, Oilfield Chemistry Research Institute of Drilling and Production, Dagang Oil Fields, Dagang Oilfield Group Co., Ltd., vol. 14, No. pp. 24-27, Mar. 25, 1997.

Database WPI, Week 201115, XP-002693470, Thomson Scientific, London, GB, C:\EPOPROGS\SEA\.\.\.\epodata\sea\eplogf\internal.log.

E. Raymundo-Pinero, "Temperature Programmed Desorption Study on the Mechanism of SO2 oxidation by Activated Carbon and Activated Carbon Fibres," Carbon, vol. 39, 2001, pp. 231-242.

European Search Report and Written Opinion dated Aug. 2, 2013, for related European Patent Application 13174172.

Examination Report dated Jun. 28, 2011 for related European Patent Application No. 08857250.9.

Gao, X. "Adsorption and Reduction of NO2 Over Activated Carbon at Low Temperature," Fuel Processing Technology 92, 2011,pp. 139-146.

Isao Mochida, "Adsorption and Adsorbed Species of SO2 during its Oxidative Removal over Pitch-Based Activated Carbon Fibers," Energy & Fuels, vol. 13, No. 2, 1999, pp. 369-373.

Isao Mochida, Kinetic Study of the Continuous Removal of SOx on Polyacrylonnitrile-Based Activated Carbon Fibres, Fuel vol. 76, No. 6, 1997, pp. 533-536.

Isao Mochida, "Removal of SOx and NOx over activated carbon fibers," Carbon, vol. 38, 2000 pp. 227-239.

Khalil, C.N., et al., "Detection of Formation Damage Associated to Paraffin in Reservoirs of the Reconcavo Baiano, Brazil," SPE 37238, Int'l Symposium on Oilfield Chemistry held in Houston, TX, Feb. 18-21, 1997, Society of Petroleum Engineers, Inc.

Kiryukhin, et al., Thermal-Hydrodynamic Modeling of Laboratory Tests on the Interaction of NaNO3—NaOH Fluids with Sandstone Rock at a Deep Radionuclide Repository Site, pp. 1-20, Russia.

Marques, L.C.C., et al., "A New Technique to Solve Gas Hydrate Problems in Subsea Christmas Trees." SPE 77572, SPE Production & Facilities, Nov. 2004, pp. 253-258, Society of Petroleum Engineers.

Mure Te, "Oxidation Reactivities of Dibenzothiophenes in Polyoxometalate/H202 and Formic Acid/H202 Systems," Applied Catalysis A: General 219, 2001, pp. 267-280.

N. Shirahama, "Mechanistic Study on Adsorption and Reduction of NO2 Over Activated Carbon Fibers, "Carbon, vol. 40, 2002, pp. 2605-2611.

Paolo DeFilippis, "Oxidative Desulfurization: Oxidation Reactivity of Sulfur Compounds in Different Organic Matrixes," Energy & Fuels, vol. 17, No. 6, 2003, pp. 1452-1455.

PCT International Search Report and the written opinion dated Apr. 8, 2014; International Application No. PCT/US2013/043076; International filing date May 29, 2013.

PCT Notification of Transmittal of the International Search Report and the Written Opinion of the International Searching Authority, or the Declaration; dated Mar. 18, 2013; International Appln No. PCT/US2013/021961; Int'l File Date: Jan. 17, 2013.

PCT Notification of Transmittal of the International Search Report and the Written Opinion of the International Searching Authority, or the Declaration; dated Mar. 5, 2013; International Appln No. PCT/US2012/066249; Int'l File Date: Nov. 21, 2012.

Sampanthar, J. "A Novel Oxidative Desulfurization Process to Remove Refractory Sulfur Compounds From Diesel Fuel," Applied Catalysis B: Environmental 63, 2006, pp. 85-93.

Sano, Y. "Two-step Adsorption Process for Deep Desulfurization of Diesel Oil," Fuel 84 (2005) 903-910.

Sano, Y. et al., Selection and Further Activation of Activated Carbons for Removal of Nitrogen Species in Gas Oil as a Pretreatment for its Deep Hydrodesulfurization, Energy & Fuels, vol. 18, Mar. 20, 2004, pp. 644-651.

Sano, Y., "Adsorptive Removal of Sulfur and Nitrogen Species from a Straight Run Gas Oil Over Activated Carbons for its Deep Hydrodesulfurization," Applied Catalysis B: Environmental 49, 2004, pp. 219-225.

Satoru Murata, "A Novel Oxidative Desulfurization System for Diesel Fuels with Molecular Oxygen in the Presence of Cobalt Catalysts and Aldehydes," Energy & Fuels, vol. 18, No. 1, 2004, pp. 116-121.

Schlumberger Systems, Sand Control Pumping, pp. 37-70, USA, available at www.slb.com/~/media/files/sand_control/.../scps_03_systems.ashx. Feb. 27, 2012.

Shujiro Otsuki, "Oxidative Desulfurization of Light Gas Oi and Vacuum Gas Oil by Oxidation and Solvent Extraction," Energy & Fuels, vol. 14, No. 6, 2000, pp. 1232-1239.

Yazu, K.; "Immobilized Tungstophosphoric Acid-Catalyzed Oxidative Desulfurization of Diesel Oil with Hydrogen Peroxide," Journal of Japan Petroleum Institute, vol. 46, No. 6, 2003, pp. 379-382.

Yazu, K.; "Oxidative Desulfurization of Diesel Oil with Hydrogen Peroxide in the Presence of Acid Catalyst in Diesel Oil/Acetic Acid Biphase System," Chemistry Letters, vol. 33, No. 10, 2004, pp. 1306-1307.

* cited by examiner

Pre Reaction

Post Reaction

COMPOSITIONS AND METHODS FOR ENHANCED FRACTURE CLEANUP USING REDOX TREATMENT

PRIORITY

This application is a continuation application of and claims priority to and the benefit of U.S. non-provisional patent application Ser. No. 16/039,966, issued as U.S. Pat. No. 10,308,862 and filed Jul. 19, 2018, which itself is a continuation-in-part application of and claims priority to and the benefit of U.S. non-provisional patent application Ser. No. 15/205,994, filed Jul. 8, 2016, now issued as U.S. Pat. No. 10,053,614, which itself is a continuation-in-part application of U.S. non-provisional patent application Ser. No. 14/689,901, filed Apr. 17, 2015 and now issued as U.S. Pat. No. 9,701,894, which claims priority to and the benefit of U.S. Provisional Patent Application No. 61/980,664, filed Apr. 17, 2014, the entire disclosures of which are expressly incorporated here by reference.

FIELD

This disclosure relates to a composition and method to improve the recovery of hydrocarbons from a fractured formation. More specifically, this disclosure relates to a composition and method to reduce the viscosity of a fracturing fluid or other undesired viscous fluid present in a wellbore or hydrocarbon-bearing reservoir.

BACKGROUND

Hydraulic fracturing fluids containing proppants are used extensively to enhance productivity from hydrocarbon-bearing reservoir formations, including carbonate and sandstone formations. During hydraulic fracturing operations, a fracturing treatment fluid is pumped under a pressure and rate sufficient for cracking the formation of the reservoir and creating a fracture. Fracturing operations usually consist of three main stages including a pad fluid stage, a proppant fluid stage, and an overflush fluid stage. The pad fluid stage typically consists of pumping a pad fluid into the formation. The pad fluid is a viscous gelled fluid which initiates and propagates the fractures. Auxiliary fractures can propagate from the fractures to create fracture networks. A fracture network can comprise fractures and auxiliary fractures. Auxiliary fractures can connect the fractures.

The proppant fluid stage involves pumping a proppant fluid into the fractures of the formation. The proppant fluid contains proppants mixed with a viscous gelled fluid or a visco-elastic surfactant fluid. The proppants in the proppant fluid are lodged in the fractures and create conductive fractures through which hydrocarbons flow. The final stage, the overflush stage, includes pumping a viscous, gelled fluid into the fractures to ensure the proppant fluid is pushed inside the fractures. While the three stages have different aims, all three make use of highly viscous fluids, in addition to or alternative to gelled fluids, to achieve those aims.

A downside of the traditional method is that a high volume of gelled or polymeric materials can be left behind in the fractures. The gelled materials can be concentrated around the proppant in the fractures or can be freely located in the fractures. The gelled material acts to block the fractures reducing the fracture conductivity. The hydrocarbons which flow from the reservoir formation are unable to move the gelled materials. Traditional methods for cleaning the fractures involve viscosity breakers or other elements to breakdown the viscous fracturing fluids. These traditional methods suffer from an inability to completely cleanup the fractures, leaving residual viscous material and reduced conductivity.

SUMMARY

This disclosure relates to a composition and method to improve the recovery of hydrocarbons from a fractured formation. More specifically, this disclosure relates to a composition and method to reduce the viscosity of a fracturing fluid or a blockage material, such as, for example, a gelled or viscous fracturing fluid, or asphaltenes, or a similar oily sludge.

In one aspect, a method for improved hydrocarbon recovery from a formation due to cleanup of a residual viscous material is provided. The method includes the step of fracturing the formation with a fracturing fluid to generate fractures. The fracturing fluid includes a viscous fluid component, the viscous fluid component operable to fracture the formation to create fractures leaving behind the residual viscous material in the fractures, the viscous fluid component having a viscosity, a proppant component, the proppant component includes a proppant, the proppant operable to hold open the fractures, where the proppant component is carried to the fractures by the viscous fluid component, and a cleanup fluid.

The cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the formation. Fractures can include auxiliary fractures, which propagate from the fractures.

In certain aspects, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects of the disclosure, the acid precursor is triacetin.

In a second aspect of the present disclosure, a cleanup fluid for reducing a viscosity of a residual viscous material in fractures is provided. The cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the fractures.

In certain aspects, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects of the present disclosure, the acid precursor is triacetin.

In a third aspect, a method to cleanup fractures post hydraulic fracturing is provided. The method includes the steps of fracturing a formation in a hydraulic fracturing operation to produce fractures, and injecting a cleanup fluid into the fractures to reduce a viscosity of a residual viscous material.

In certain aspects of the present disclosure, the step of fracturing the formation includes the step of fracturing the formation with a fracturing fluid to generate fractures. The fracturing fluid includes a viscous fluid component, the viscous fluid component operable to fracture the formation to create fractures leaving behind the residual viscous material in the fractures, the viscous fluid component having a viscosity, and a proppant component, the proppant component comprising a proppant, the proppant operable to hold open the fractures, where the proppant component is carried to the fractures by the viscous fluid component. In certain aspects of the present disclosure, the cleanup fluid includes an acid precursor, the acid precursor operable to trigger an exothermic reaction component, and the exothermic reaction component operable to generate heat, where the heat is operable to reduce a viscosity of the residual viscous material to create a reduced viscosity material, the reduced viscosity material operable to flow from the fractures. In certain aspects of the present disclosure, the exothermic reaction component includes an ammonium containing compound and a nitrite containing compound. In certain aspects, the ammonium containing compound is $NH_4Cl$ and the nitrite containing compound is $NaNO_2$. In certain aspects, the acid precursor is triacetin.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
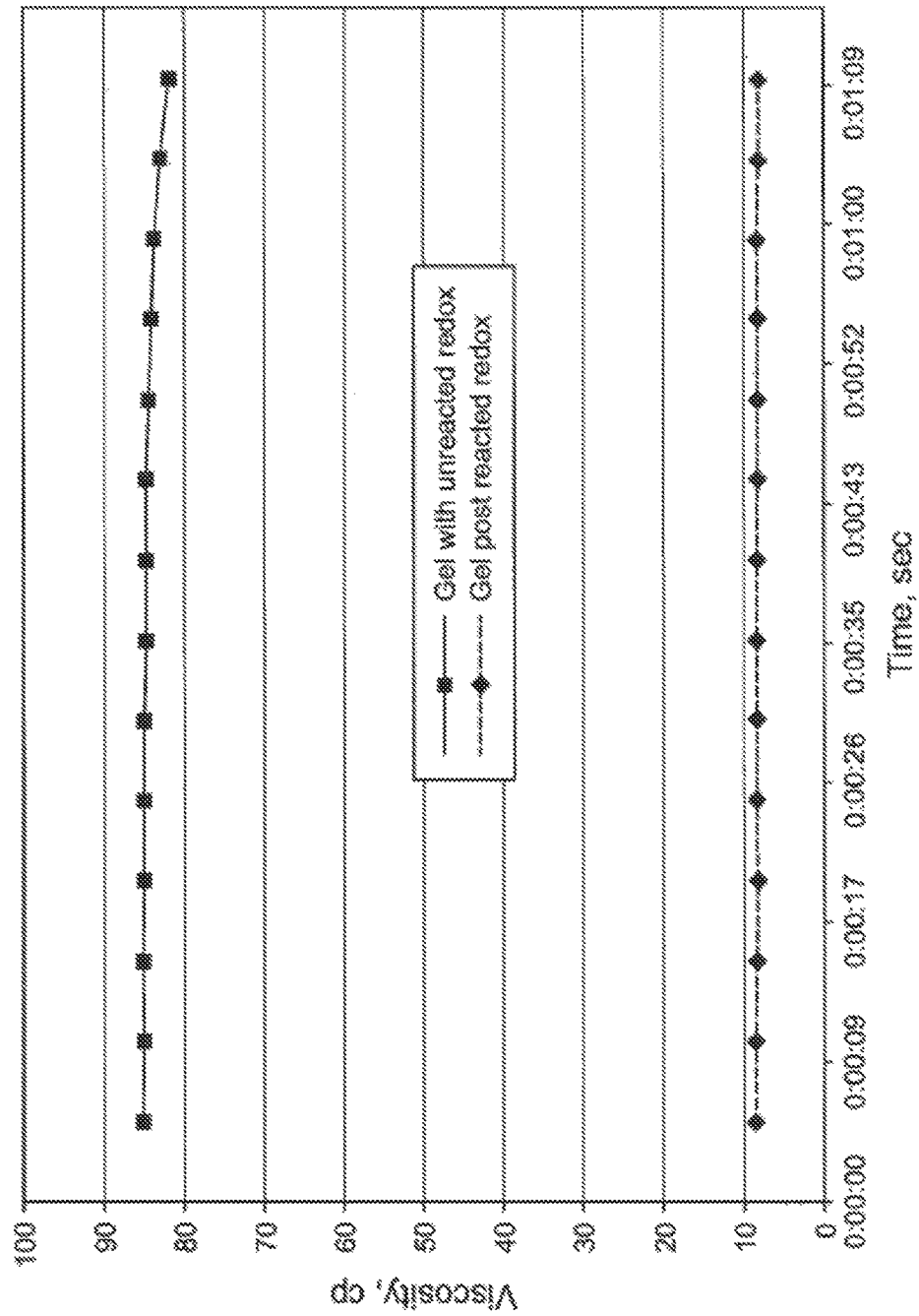
FIG. 1 is a graphic representation of the effect of the cleanup fluid on the viscosity of a residual viscous material.

While the disclosure will be described with several embodiments, it is understood that one of ordinary skill in the relevant art will appreciate that many examples, variations and alterations to the apparatus and methods described here are within the scope and spirit of the disclosure. Accordingly, the embodiments described here are set forth without any loss of generality, and without imposing limitations, on the claims.

In one aspect, a method for improved hydrocarbon recovery from a formation due to cleanup of a residual viscous material is provided. The hydraulic fracturing operation fractures the formation using fracturing fluid to create fractures. Formations include sandstone and carbonate, for example.

The fracturing fluid includes a viscous fluid component and a proppant component. The viscous fluid component has a viscosity. The viscous fluid component is operable to increase the viscosity of the fracturing fluid. Viscous fluid components include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose.

Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels. In at least one embodiment of the present disclosure, the viscous fluid component is an aqueous guar solution, having a concentration of guar gum between about 0.1% and about 15%, between about 0.1% and about 10%, between about 1% and about 10%, between about 2% and about 8%, and between about 4% and about 6%.

The proppant component includes a proppant. The proppant is operable to hold open fractures created by the viscous fluid component. Any proppants capable of holding open fractures to create a conductive fractures are suitable for use in the present disclosure. In some embodiments, the proppant component includes a viscous carrier fluid having a viscosity. Viscous carrier fluids include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose.

Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels. In some embodiments, the hydraulic fracturing operation uses a one stage fracturing fluid, in which the fracturing fluid includes both the viscous fluid component and the proppant component, in which the viscous fluid component carries the proppant component to the fractures.

In at least one embodiment, the hydraulic fracturing operation uses a multi-stage fracturing fluid in which the viscous fluid component is injected into the formation, followed by the proppant component in the viscous carrier fluid. In some embodiments, the injection of the proppant component is followed by injection of additional viscous fluids to ensure the proppants are placed in the fractures. The additional viscous fluids have a viscosity.

In some embodiments, the viscosity of the viscous fluid component, the viscous carrier fluid, and additional viscous fluids are the same. In some embodiments, the viscosity of the viscous fluid component, the viscous carrier fluid, and additional viscous fluids are different. The injection of the fracturing fluid ceases after the proppants are placed in the fractures and the fracturing fluid is allowed to seep from the fractures. In some embodiments, the injection of the hydraulic fracturing fluid including the viscous fluid component in addition to or alternative to the proppant component in addition to or alternative to the overflush component in addition to or alternative to the exothermic reaction component does not generate foam or introduce foam to the hydraulic formation including the hydraulic fractures.

The hydraulic fracturing operation can leave residual viscous material in the fractures of a hydraulic formation. Residual viscous materials can include carboxymethyl cellulose, hydroxyethyl cellulose, carboxymethyl hydroxyethyl cellulose, hydroxypropyl cellulose, methyl hydroxyl ethyl cellulose, guar gum, hydroxypropyl guar, carboxymethyl guar, guar cross-linked with boron, aluminum phosphate-ester oil gel, and guar cross-linked with organometallic compounds. Organometallic compounds include zirconium, chromium, antimony, and titanium salts. In some embodiments of the present disclosure, the residual viscous material is a gelled material. In some embodiments of the present disclosure, the residual viscous material is a polymeric material. In at least one embodiment of the present disclosure, the residual viscous material is guar gum. The residual viscous material has a viscosity greater than the fracturing fluid. In at least one embodiment of the present disclosure, the residual viscous material is surrounding or adjacent to the proppants placed in the fractures.

The cleanup fluid acts, after the proppants have been placed in the fractures, to remove the residual viscous material. In one embodiment, the cleanup fluid is mixed with the fracturing fluid. In at least one embodiment of the present disclosure, where a multi-stage fracturing fluid is used, the cleanup fluid is a component of the fluids used at each stage of the hydraulic fracturing operation. In an alternate embodiment, the cleanup fluid is added only to the fluid of the final stage of the hydraulic fracturing operation, such as, for example, the overflush stage. In some embodiments, the cleanup fluid is pumped to the fractured formation as a separate step following the hydraulic fracturing operation.

In some embodiments, the cleanup fluid includes an acid precursor and an exothermic reaction component. The reaction of the exothermic reaction component results in a release of kinetic energy and thermal energy. The reaction of the exothermic reaction component generates heat and increases the pressure. The generated heat increases the temperature of the surrounding fluids, including fracturing fluid remaining in the fractures and residual viscous material. The increase in temperature reduces the viscosity of the fracturing fluid. The increase in temperature reduces the viscosity of the residual viscous material left in the fractures to create a reduced viscosity material. The reduced viscosity material flows from the fractures of the formation to the wellbore. The increase in pressure provides lift energy to push the reduced viscosity materials through the wellbore toward the surface. The removal of the residual viscous material increases the conductivity of the fractures. Increased conductivity of the fractures increases seepage of the fracturing fluid, improves fracturing efficiency, minimizes need for additional fracturing jobs, minimizes time between fracturing and well production, and increases hydrocarbon flow, which translates to increased hydrocarbon recovery.

The acid precursor is any acid that releases hydrogen ions to trigger the reaction of the exothermic reaction component. Acid precursors include triacetin (1,2,3-triacetoxypropane), methyl acetate, HCl, and acetic acid. In at least one embodiment, the acid precursor is triacetin. In at least one embodiment, the acid precursor is acetic acid.

The exothermic reaction component includes one or more redox reactants that exothermically react to produce heat and increase pressure. Exothermic reaction components include urea, sodium hypochlorite, ammonium containing compounds, and nitrite containing compounds. In at least one embodiment of the present disclosure, the exothermic reaction component includes ammonium containing compounds. Ammonium containing compounds include ammonium chloride, ammonium bromide, ammonium nitrate, ammonium sulfate, ammonium carbonate, and ammonium hydroxide.

In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In at least one embodiment of the present disclosure, the exothermic reaction component includes two redox reactants: $NH_4Cl$ and $NaNO_2$, which react according to the following:

$$NH_4Cl + NaNO_2 \xrightarrow{(H^+ \text{ or } \Delta H)} N_2 + NaCl + 2\ H_2O + \text{Heat}$$

In a reaction of the exothermic reaction components according to the previous equation, generated gas and heat contribute to the reduction of the viscosity of the residual viscous material.

The exothermic reaction component is triggered to react. In at least one embodiment of the present disclosure, the exothermic reaction component is triggered within the fractures. In at least one embodiment of the present disclosure, the acid precursor triggers the exothermic reaction component to react by releasing hydrogen ions.

In at least one embodiment, the exothermic reaction component is triggered by heat. The wellbore temperature is reduced during a pre-pad injection or a pre-flush with brine and reaches a temperature less than 120° F. (48.9° C.). The fracturing fluid of the present disclosure is then injected into the well and the wellbore temperature increases. When the wellbore temperatures reaches a temperature greater than or equal to 120° F., the reaction of the redox reactants is triggered. In at least one embodiment, the reaction of the redox reactants is triggered by temperature in the absence of the acid precursor. In at least one embodiment, the exothermic reaction component is triggered by heat when the exothermic reaction component is within the fractures.

In at least one embodiment, the exothermic reaction component is triggered by pH. A base is added to the fracturing fluid of the present disclosure to adjust the pH to between 9 and 12. In at least one embodiment, the base is potassium hydroxide. The fracturing fluid with the base is injected into the formation. Following the injection of the fracturing fluid, an acid is injected to adjust the pH to less than 6. When the pH is less than 6, the reaction of the redox reactants is triggered. In at least one embodiment, the exothermic reaction component is triggered by pH when the exothermic reaction component is within the fractures.

In at least one embodiment of the present disclosure, the cleanup fluid is introduced to the fractures following the hydraulic fracturing operation. Dual-string coiled tubing is used to introduce the exothermic reaction component and the acid precursor to the wellbore. In at least one embodiment, the exothermic reaction component includes $NH_4Cl$ and $NaNO_2$. The acid precursor is acetic acid. The acetic acid is mixed with $NH_4Cl$ and injected in parallel with the $NaNO_2$, using different sides of the dual-string coiled tubing. The exothermic reaction component and the acid precursor mix within the fractures.

EXAMPLES

Example 1

Figure 3A:
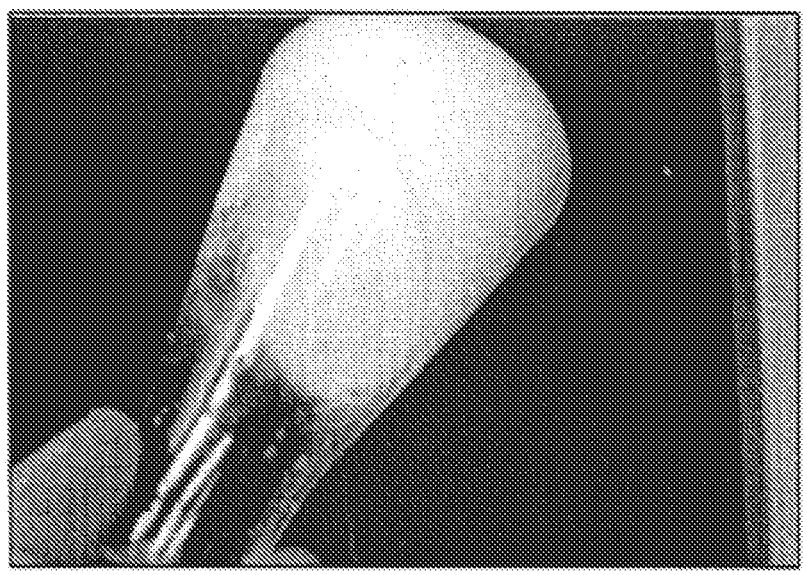
FIG. 3a is a pictorial representation of the residual viscous material before the reaction of an exothermic reaction component of the cleanup fluid.
Figure 3B:
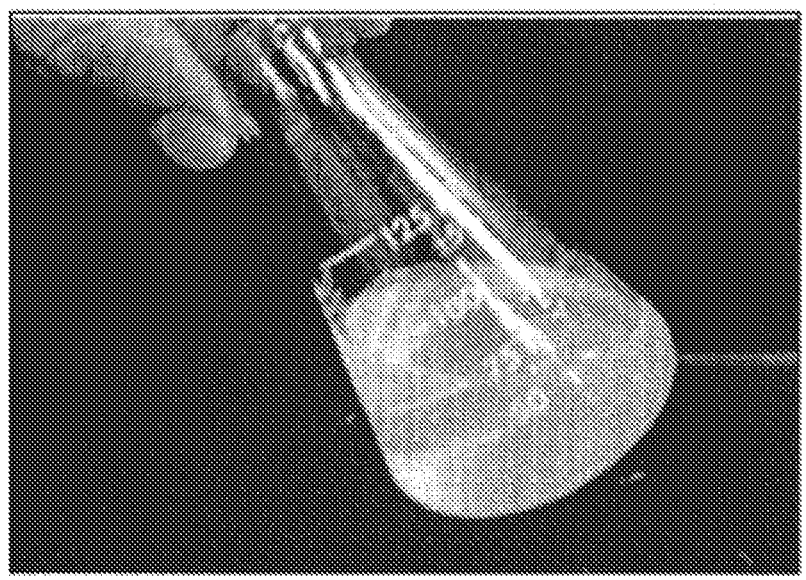
FIG. 3b is a pictorial representation of the residual viscous material after the reaction of an exothermic reaction component of the cleanup fluid.

An exothermic reaction component of a cleanup fluid consisting of 3M $NH_4Cl$ and 3M $NaNO_2$ was added to a solution of 1% by volume guar at room temperature, see FIG. 3. The exothermic reaction component was triggered by heat. The viscosity of the solution was measured before, during, and after the reaction using a Chandler viscometer. Prior to reaction of the exothermic reaction component, the viscosity of the residual viscous material was 85 centipoise (cP). FIG. 1 is a graph of the viscosity following the reaction of the exothermic reaction component. The graph shows that the viscosity of the residual viscous material was reduced to less than 8.5 cP. FIG. 3b shows the solution, including the residual viscous material after the reaction of the exothermic reaction component.

Example 2

Figure 2:
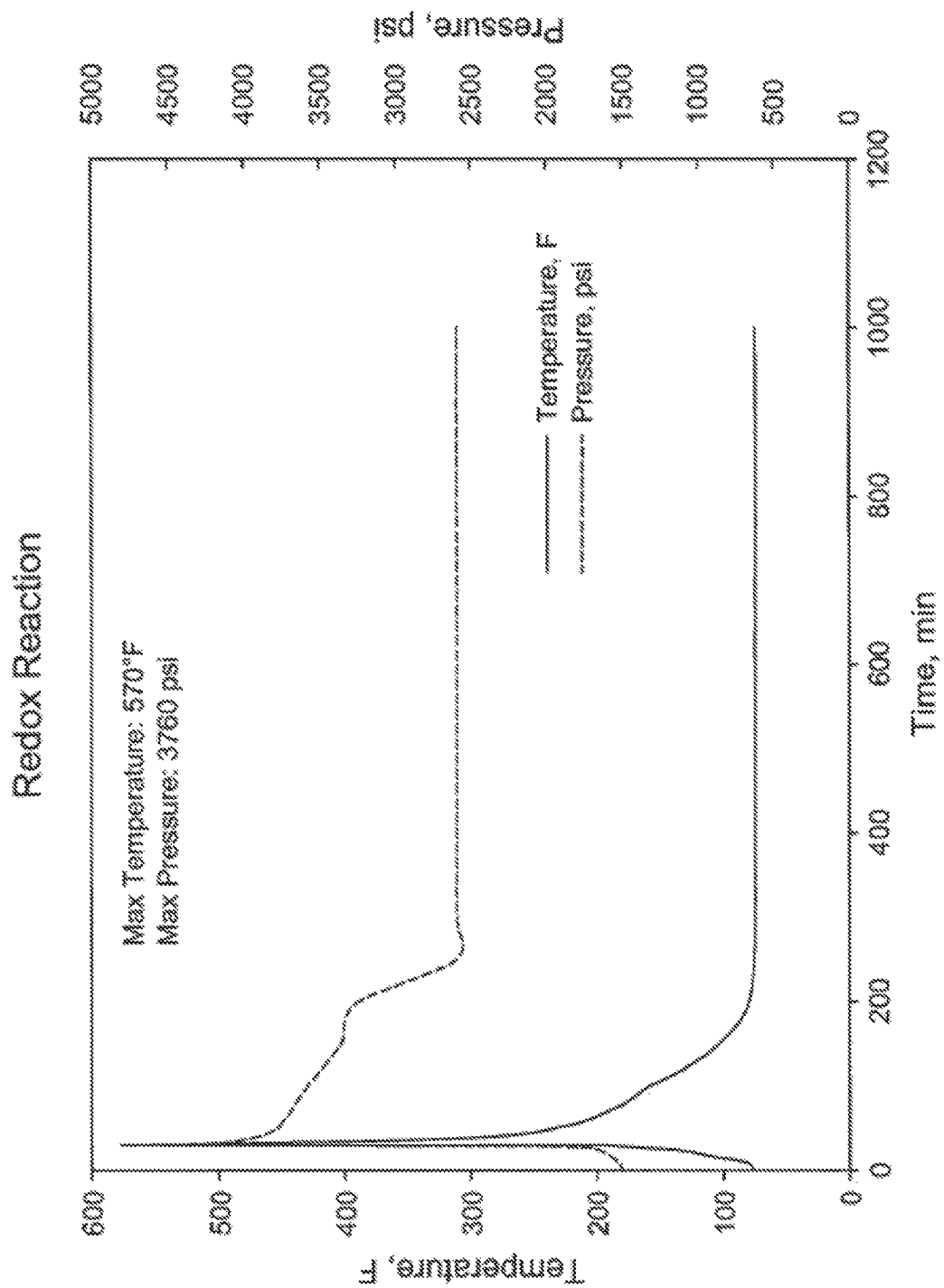
FIG. 2 is a graphic representation of the heat and pressure generated by an exothermic reaction component.

A solution of an exothermic reaction component was prepared from 3M $NH_4Cl$ and 3M $NaNO_2$. The solution was placed in an autoclave reactor at room temperature and an initial pressure of 1,000 psi. The reactor temperature was increased. The reaction was triggered at about 120° F., see FIG. 2. Due to the reaction, the temperature in the reactor reached a temperature of 545° F. and a pressure of 3,378 psi, see FIG. 2.

Example 3

Figure 4:
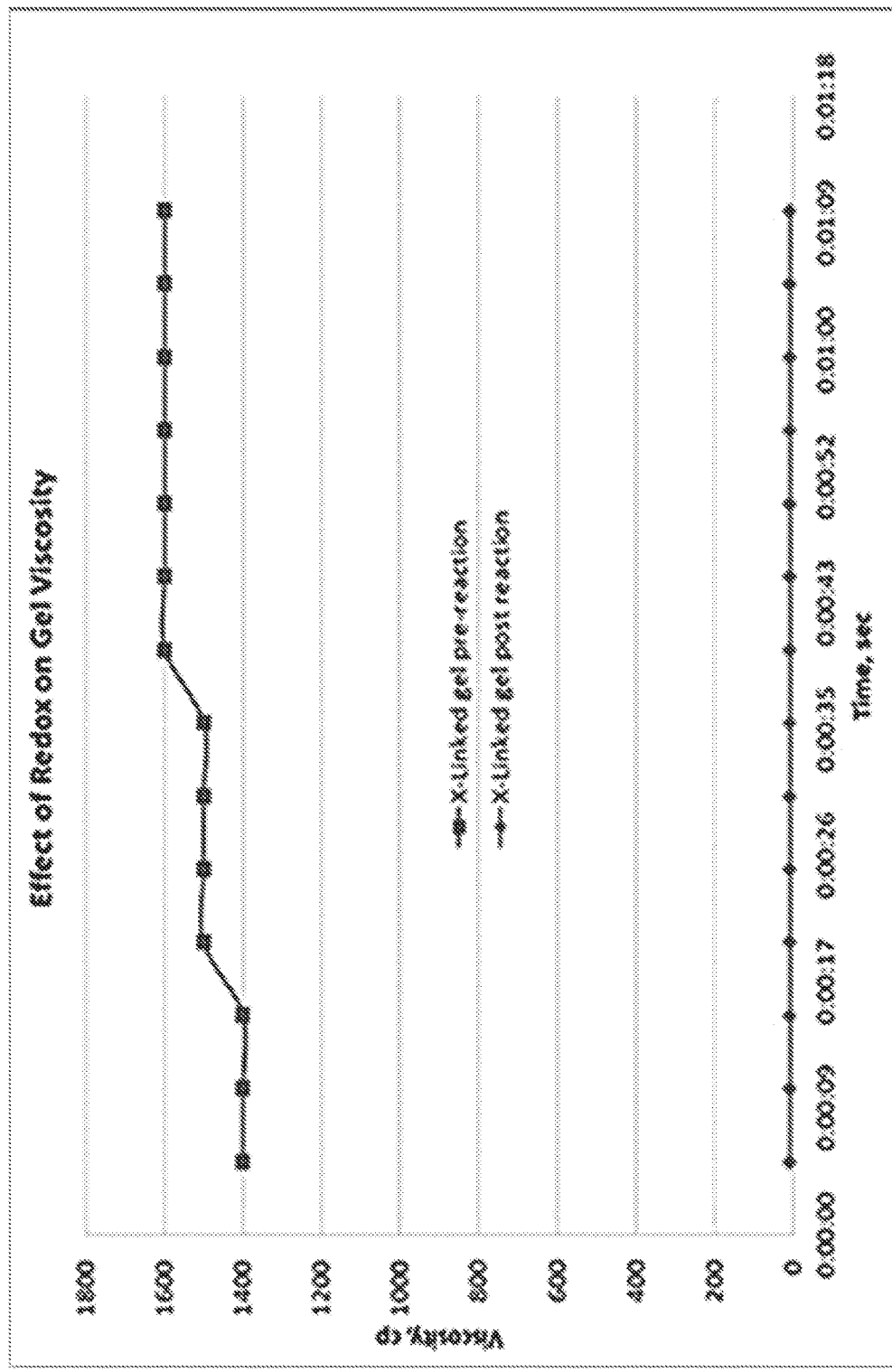
FIG. 4 is a graphic representation of the effect of the reaction of the exothermic reaction component on the viscosity of a fracturing fluid.

The exothermic reaction component showed compatibility with the viscous fluid component (here a cross-linked gel). The fracturing fluid with the viscous fluid component, the exothermic reaction component, and the proppant component was also prepared and showed compatibility. The fracturing fluid, without the proppant component, was activated in the autoclave reactor by heating to the wellbore temperature to trigger the reaction of the exothermic reaction component. The heat generated by the reaction reduced the viscosity of the viscous fluid component to produce a reduced viscosity material, without injecting the viscosity breaker. Using a chandler viscometer, the viscosity of the fracturing fluid, containing the viscous fluid component and the exothermic reaction component, was measured pre-reaction and post-reaction. The viscosity of the fracturing fluid was reduced from 1600 cP to 10 cP, as shown in FIG. 4. The results show that the exothermic reaction component and this type of treatment can clean-up the fractures post a fracturing job.

Example 4

An exothermic reaction component was applied to treat an injection well (also referred to as the wellbore) and the surrounding rock matrix in the Safaniya Oil Field of Saudi Arabia. The injection well was damaged due to the deposition of asphaltenes and corrosion products in the wellbore and in the surrounding rock matrix. A laboratory analysis of the blockage materials showed the main components to be asphaltenes and corrosion products, as shown in Table 1.

TABLE 1

Composition of blockage materials in injection well in Safaniya Oil Field.

| Component | Weight Percent |
| --- | --- |
| Asphaltene | 11.3 |
| Iron Oxides | 32.4 |
| Iron Sulfides | 21.6 |
| Sodium Chloride | 16.5 |
| Calcium Carbonate | 9.9 |
| Silica | 8.3 |

Figure 5B:
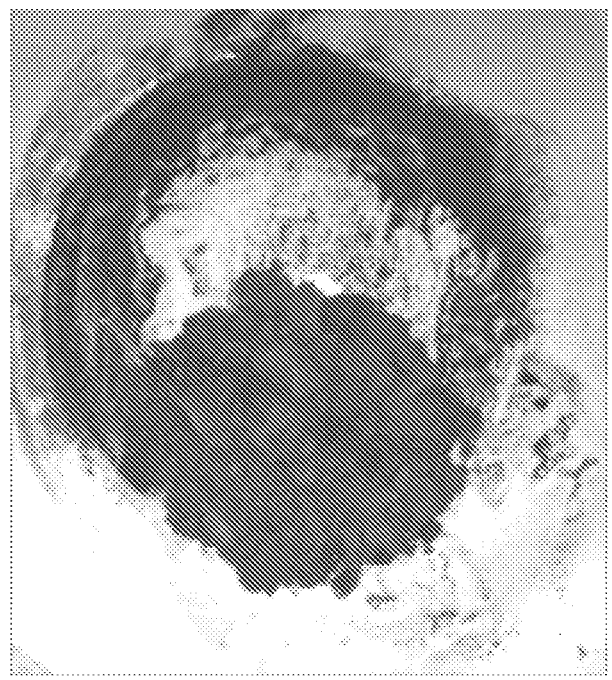
FIG. 5b is a pictorial representation of blockage materials collected from an injection well.
Figure 5A:
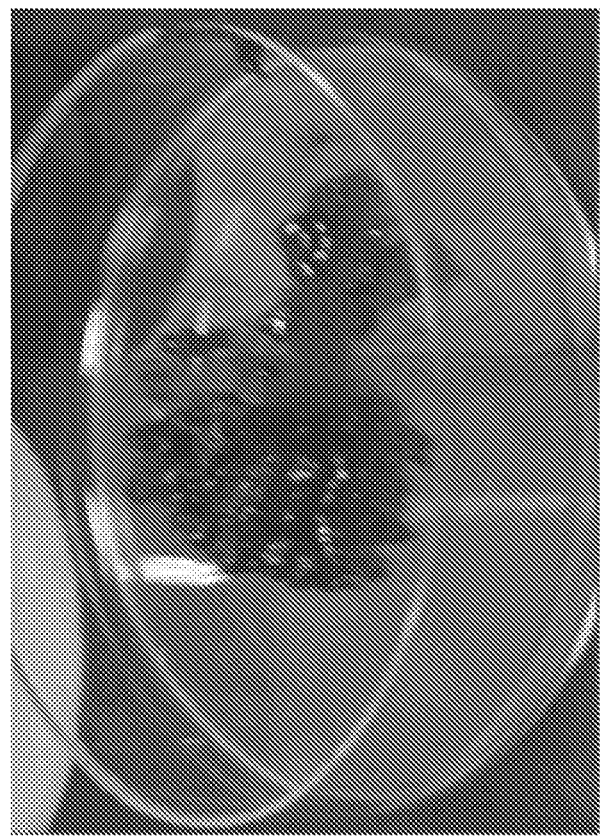
FIG. 5a is a pictorial representation of blockage materials collected from an injection well.

FIGS. 5a and 5b are pictorial representations of the blockage materials collected from the injection well. In laboratory testing of the blockage materials, the initial viscosity at 60° F. was about 5,800 cP. The American Petroleum Institute (API) number for the thick oil sludge was 11. The blockage materials were a semi-solid material. The exothermic reaction component reduced the viscosity of the blockage material from its initial viscosity and enabled easy cleanup.

Figure 6:
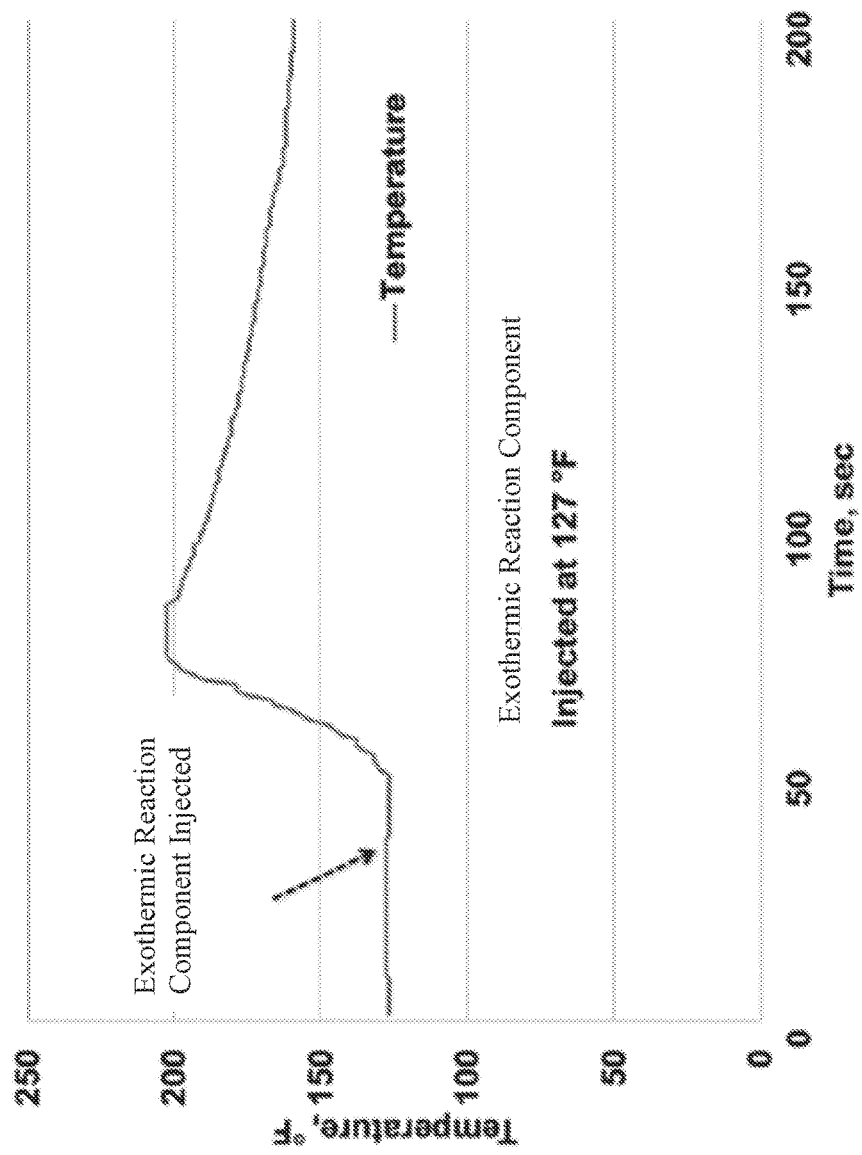
FIG. 6 is a graph showing the effect of an exothermic reaction component on the temperature of blockage materials from the injection well in Example 4.

FIG. 6 is a graph showing the effect of the exothermic reaction component on the temperature of blockage materials shown in FIGS. 5a and 5b. As can be seen, once an exothermic reaction component comprising sodium nitrite and ammonium chloride was added to the blockage materials at 127° F. at about the 50 second marker, the temperature increased to over 200° F.

Figure 7:
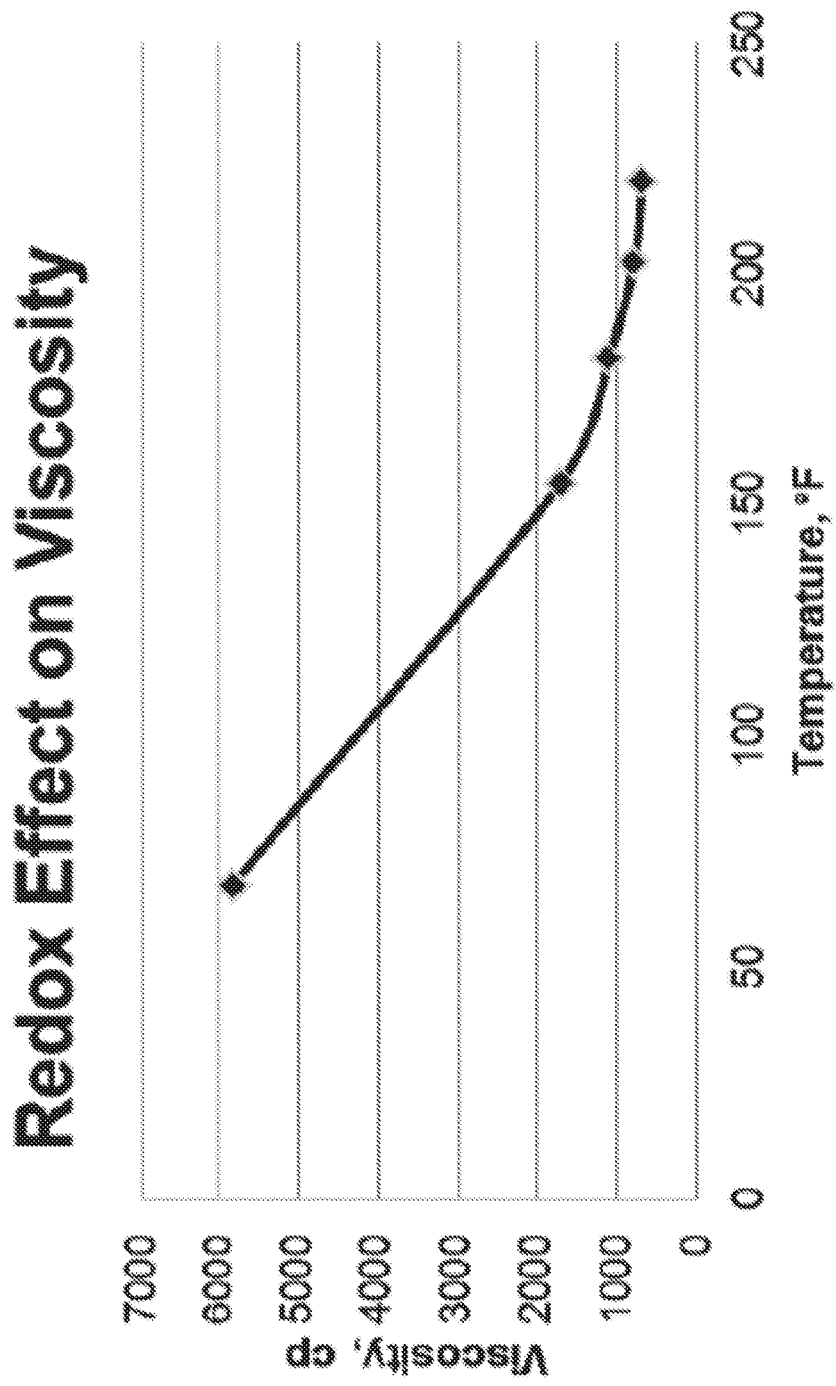
FIG. 7 is a graph showing the effect of an exothermic reaction component on the viscosity of blockage materials from the injection well in Example 4.

FIG. 7 is a graph showing the effect of an exothermic reaction component on the viscosity of blockage materials in Example 4, shown in FIGS. 5a and 5b. Surprisingly and unexpectedly, the viscosity of the blockage materials (thick oil sludge) was quickly reduced from about 6,000 cP to under 1,000 cP. In the lab-scale experiment, which used 10 grams of oil sludge material, 10 mL of 3M ammonium chloride and 10 ml of 3M sodium nitrite were added to the oil sludge material along with 2 ml of activator (100% acetic acid).

Figure 8:
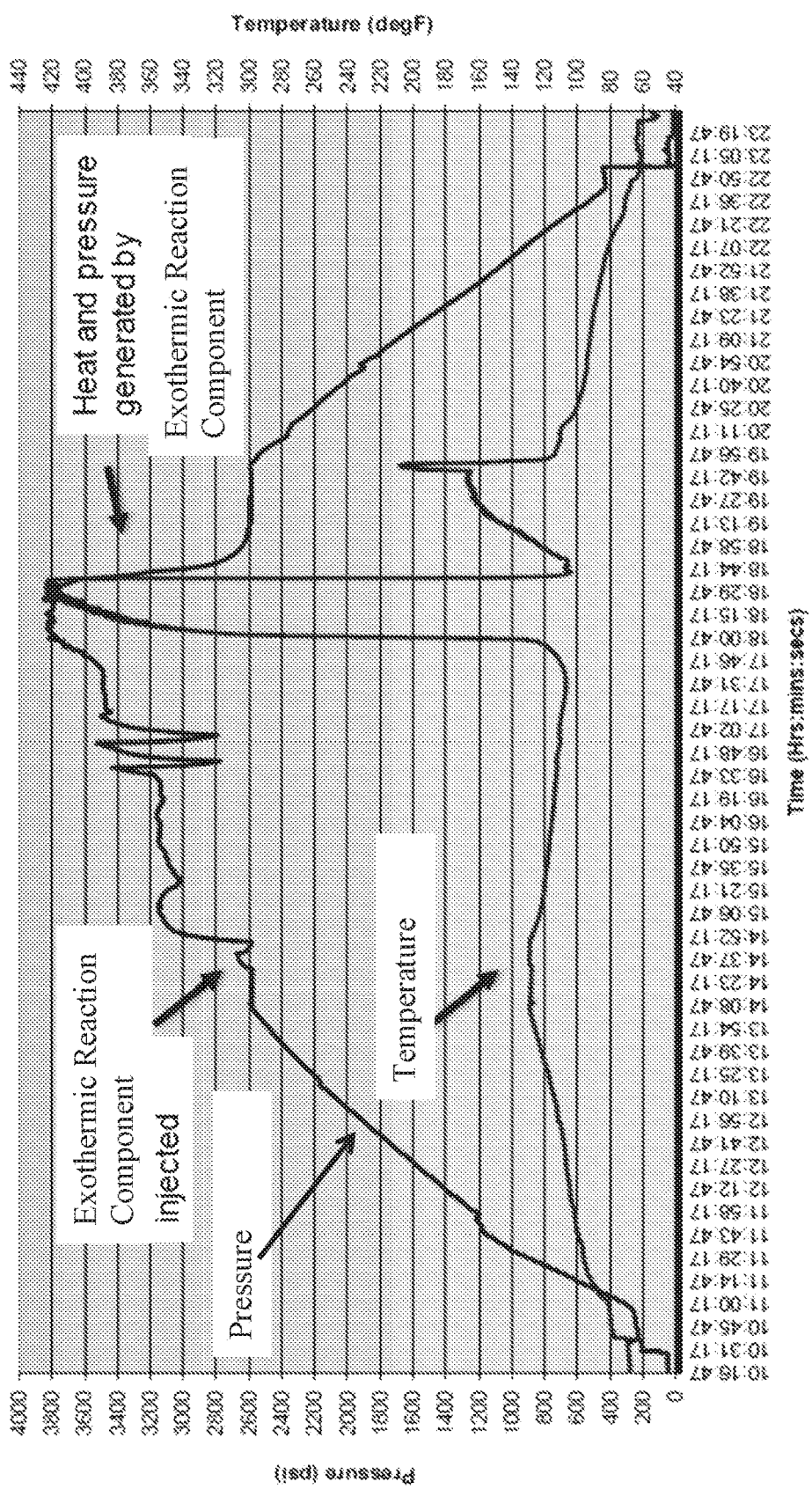
FIG. 8 is a graph showing the effect of an exothermic reaction treatment used to treat the blocked wellbore of Example 4.
Figure 9:
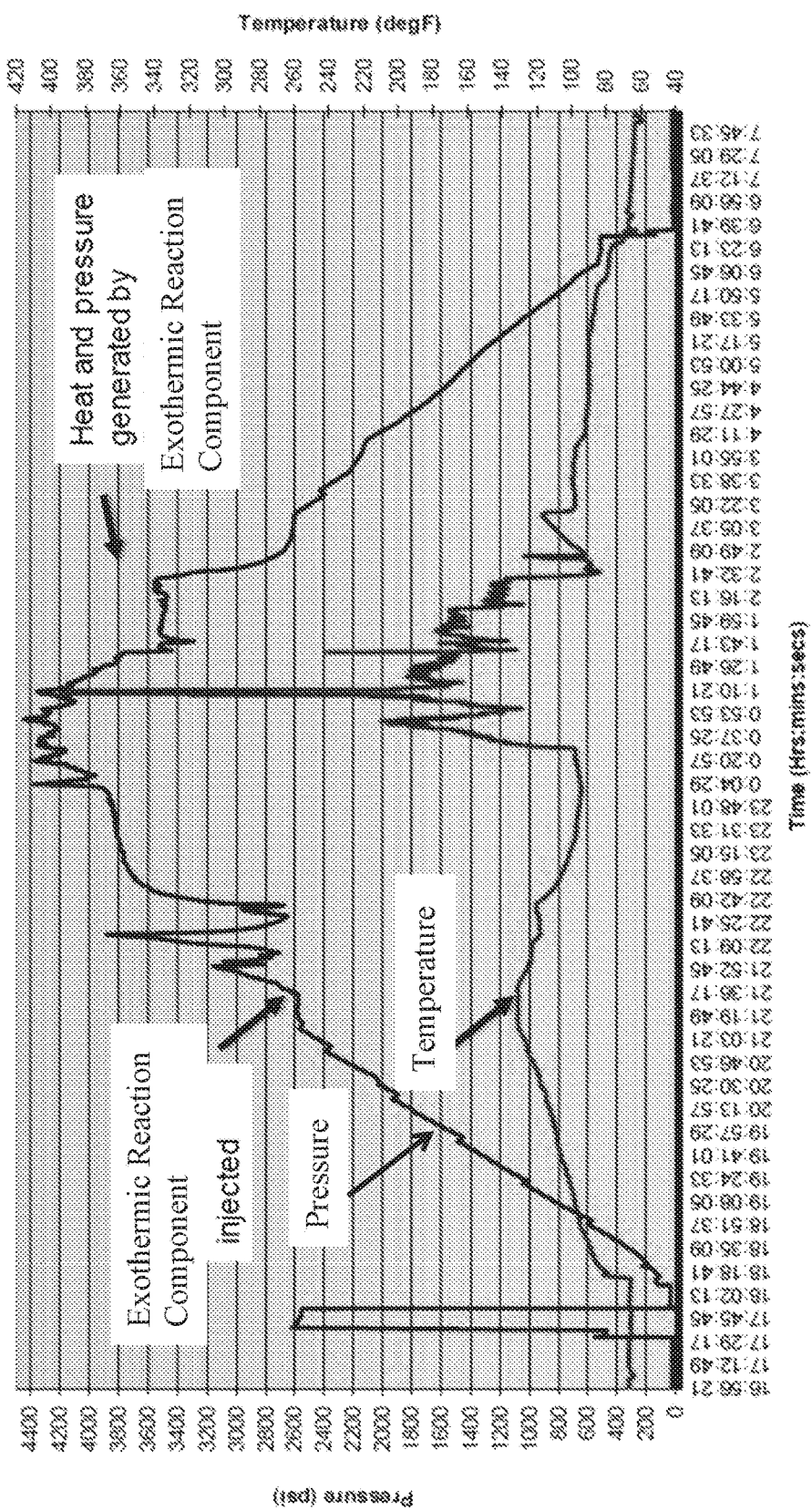
FIG. 9 is a graph showing the effect of an exothermic reaction treatment used to treat the rock matrix surrounding the wellbore of Example 4.

FIG. 8 is a graph showing the effect of an exothermic reaction treatment used to treat the blocked wellbore of Example 4. As shown by the graph, pressure and temperature within the wellbore increase with time. FIG. 9 is a graph showing the effect of an exothermic reaction treatment used to treat the rock matrix surrounding the wellbore of Example 4. As shown by the graph, pressure and temperature within the rock matrix increase with time. Before the treatment of the wellbore and the surrounding rock matrix with an exothermic reaction component, the injectivity of the wellbore was 1,000 barrels of water per day (1.0 MBWD). After the exothermic reaction treatment was used to treat the wellbore and the surrounding rock matrix, the injectivity was improved by about 6 times or about 600% to 5.8 MBPD.

Figure 10:
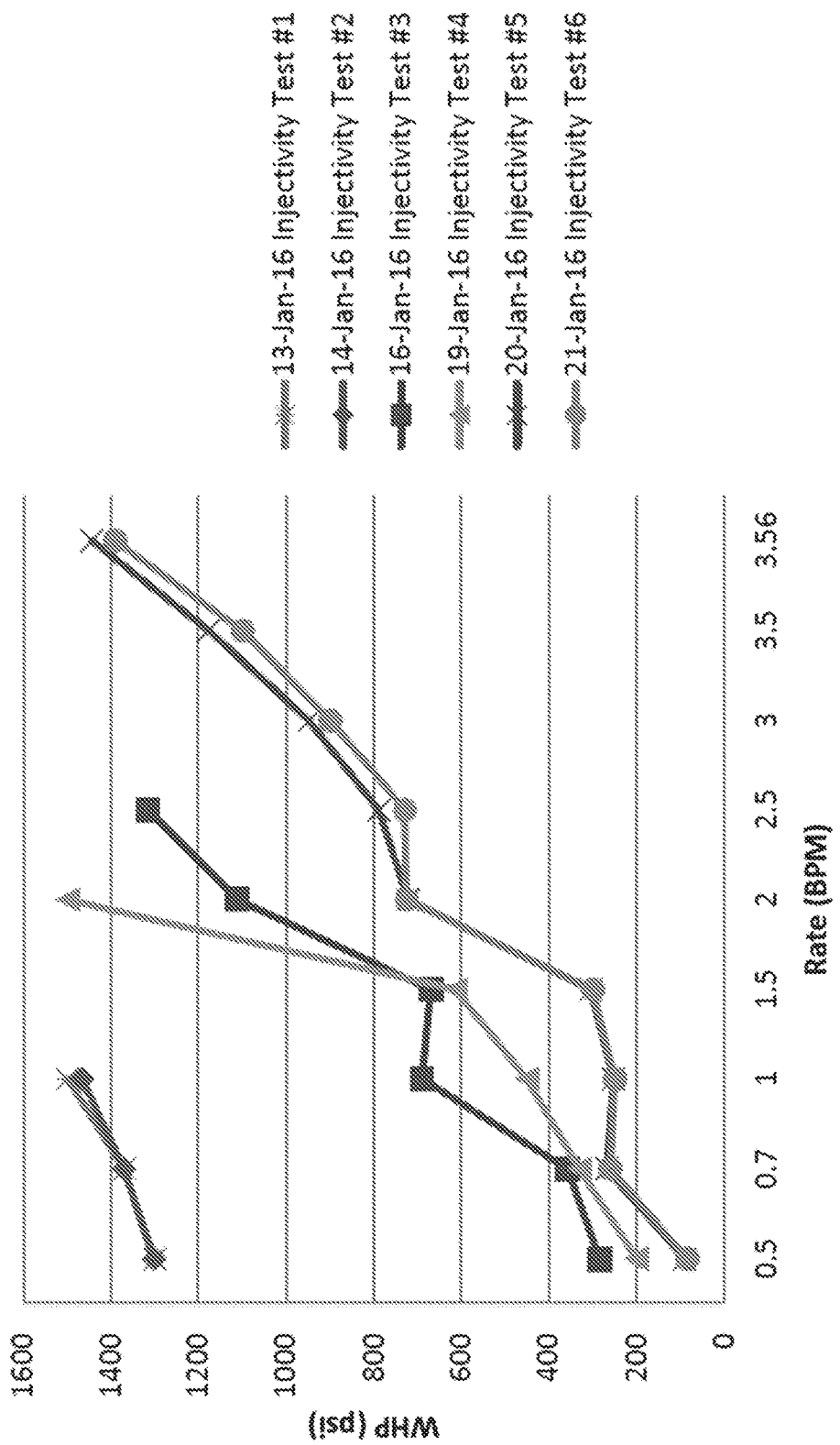
FIG. 10 is a graph showing the pre-exothermic reaction component injectivity and post-exothermic reaction component injectivity of the injection well of Example 4.

FIG. 10 is a graph showing the pre-exothermic-reaction-component injectivity and post-exothermic-reaction-component injectivity of the injection well of Example 4. As demonstrated in the graph, injectivity was increased greatly over time by the treatment with the exothermic reaction component. WHP is wellhead pressure, and BPM is barrels per minute. Comparing the WHP when pumping 1 BPM before the exothermic reaction component to afterward, injectivity was improved by about 6 times. WHP decreased from about 1,500 psi to about 253 psi. The exothermic reaction component was able to remove asphaltenes, corrosion components, scale, thick oil sludge, and other materials blocking the injection wellbore and surrounding rock matrix.

Injectivity Test #'s 1 and 2 were conducted before the injection of the exothermic reaction component. Injectivity Test #3 was conducted after the addition of 10 bbls of reagent A (sodium nitrite) and 10 bbls of reagent B (ammonium chloride and acetic acid), the reagents A and B prepared as described as follows. Before Test #4, an additional 40 bbls of each reagent A and reagent B were injected into the wellbore, followed by soaking time. Then Test #4 was conducted. Test #'s 5 and 6 were conducted after the addition of another 150 bbls of each reagent A and 150 bbls of reagent B.

To prepare sodium nitrite (reagent A) for the application of the exothermic reaction component to the injection well, first 174 barrels (bbls) of fresh water were placed in a clean tank. Then, 13,165 kilograms (kg) of sodium nitrite, from Bayouni Trading Co. of Saudi Arabia, were added to the fresh water under agitation. Additional fresh water was mixed to balance to a total volume of solution of 200 bbls (however, this step was optional). To prepare ammonium chloride (reagent B) for the application of the exothermic reaction component to the injection well, first 170 bbls of fresh water were placed in a clean tank. Then 10,313 kilograms (kg) of ammonium chloride, from Bayouni Trading Co. of Saudi Arabia, were added to the tank under agitation.

Next, 20 bbls of acetic acid, from Schlumberger of Houston, Tex., were added to the tank with the ammonium chloride. In addition, 25 gallons of corrosion inhibitor were added, and fresh water was added to achieve a total volume of solution of 200 bbls (however, this step was optional, and corrosion inhibitor is optional). The components were mixed thoroughly until all components were dissolved.

The concentration of ammonium chloride in solution and sodium nitrite in solution was about 3M. The concentration of acetic acid once mixed with the ammonium chloride solution was about 5% to about 20% by volume. Using the above method to make sodium nitrite and ammonium chloride solutions, three separate runs were carried out on the well. In a first run, 10 barrels of the sodium nitrite solution and 10 barrels of the ammonium chloride solution were added (before Injectivity Test #3 in FIG. 10). In a second run, 40 barrels of the sodium nitrite solution and 40 barrels of the ammonium chloride solution were added (before Injectivity Test #4 in FIG. 10). In a third run, 150 barrels of the sodium nitrite solution and 150 barrels of the ammonium chloride solution were added (before Injectivity Test #'s 5 and 6 in FIG. 10).

Once the sodium nitrite and ammonium chloride were prepared, the solutions were introduced to the injection well by coiled tubing to produce an exothermic reaction in situ and reduce the viscosity of the blockage materials in the well and surrounding rock matrix. In the present example, HCl was not used as an activator. In some embodiments, HCl can be used as an activator in addition to or alternative to for acid stimulation, however, it was not used during the presently described well treatment.

The exothermic reaction can be activated by acid precursors such as, for example, organic acids like acetic acid and inorganic acids such as hydrochloric acid. Such acid precursors can be encapsulated. Additional precursors can include organic esters.

Additional surprising and unexpected benefits using treatments of the present disclosure are observed. When fracturing low pressure reservoirs, usually fracturing takes a long time to flow back fracturing gel, which may take, for example, about 1-2 weeks. However, when compositions of the present disclosure are used, well head pressure is increased due to generated nitrogen gas in situ. Therefore, this accelerates the flow back time by just bleeding the pressure. As for the above treatment, well head pressure increased, when the compositions of the present disclosure were added from about 2,600 to about 4,400 psi (third run from above, see also FIG. 9). Nitrogen gas generated by the exothermic reaction downhole provides lifting energy to accelerate flow back from the well. Flow back can be reduced from about 1-2 weeks to about 1-2 hours.

Additional and different reactive chemicals that generate additional heat or pressure downhole can be used in addition to or alternative to the exothermic reaction component to enhance the efficiency. Certain example compounds include sodium azide and ammonium nitrite. Such chemicals could be used in addition to or alternative to sodium nitrite, ammonium chloride, and an activator.

Additional reactive chemicals with triggering temperatures at about 300° C. to about 400° C. could be used, where the heat generated by the reaction between ammonium chloride and sodium nitrite would provide activation energy for other reactive chemicals downhole.

Figure 11:
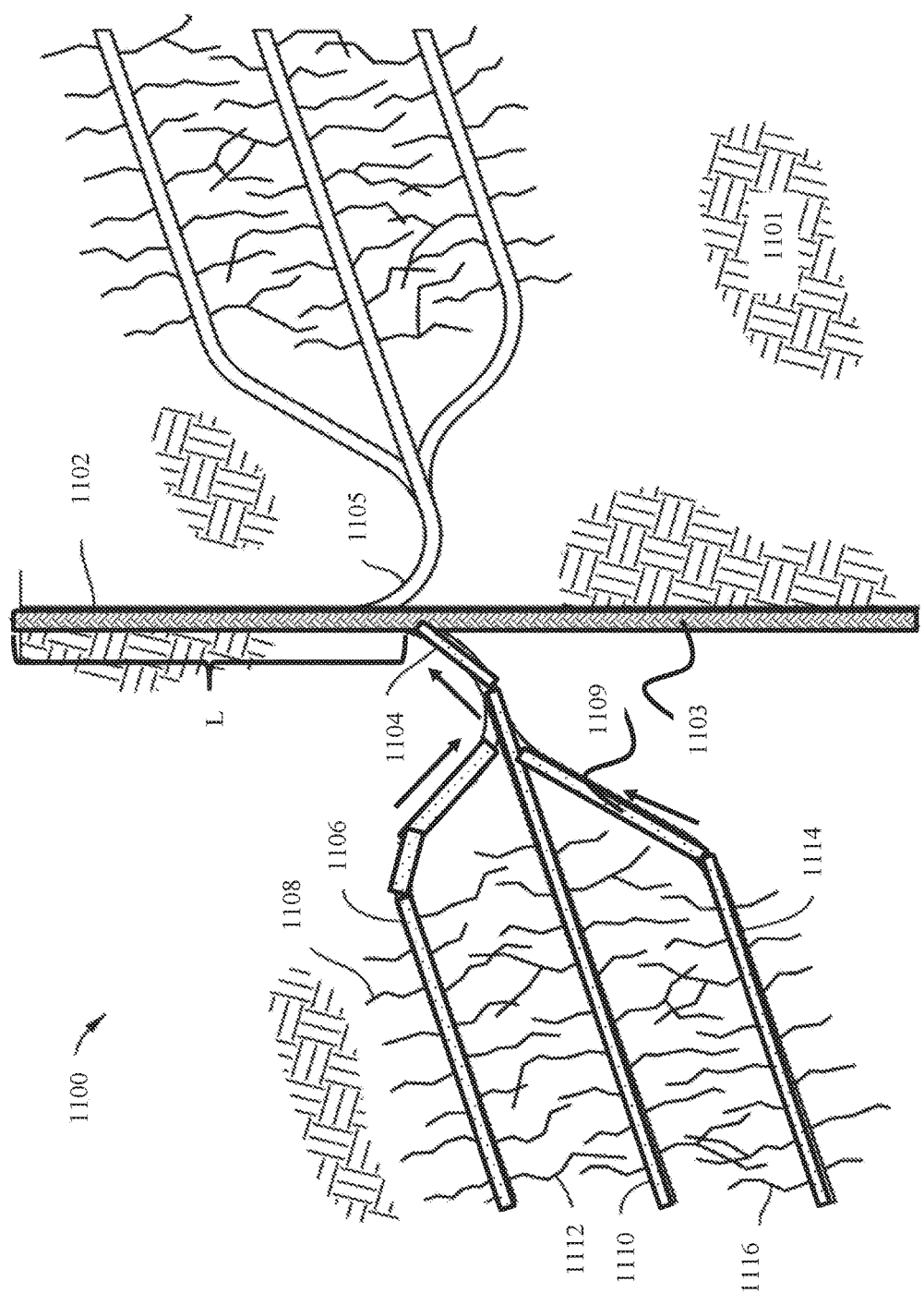
FIG. 11 is a schematic showing the optional use of a foam column with an exothermic reaction component, the foam column reducing an amount of required pressure to be generated by the exothermic reaction component to overcome hydrostatic pressure and initiate lifting and flowback from a well and reservoir, relative to a brine column.

Referring now to FIG. 11, a schematic is provided showing the optional use of a foam column with an exothermic reaction component, the foam column reducing an amount of required pressure to be generated by the exothermic reaction component to overcome hydrostatic pressure and initiate lifting and flowback from a well and reservoir, relative to a brine column.

For example, in multilateral fracture network recovery system 1100, which is disposed in hydrocarbon-bearing formation 1101, there is a vertical well 1102. Vertical wells can be open-hole recovery wells or cased-hole recovery wells, and vertical well 1102 as shown includes primary horizontal laterals 1104, 1105. In embodiments of cased wells, perforations can be used to aid in the drilling of primary horizontal laterals. In the embodiment shown, primary horizontal laterals 1104, 1105 are located at a true vertical depth (TVD) of L, which in the embodiment shown is about 12,000 feet, for example. The TVD of L of vertical well 1102 is shown to contain a foamed material 1103, and the remaining depth of vertical well 1102 below the TVD of L also contains the foamed material 1103.

From primary lateral 1104 extends branched horizontal laterals 1106, 1110, and 1114. Branched horizontal laterals can be at similar or variable vertical depths and horizontal lengths, depending on the target reservoir formation. From branched horizontal laterals 1106, 1110, 1114 extend plurality of fractures 1108, 1112, 1116, respectively, forming an overall fracture network which increases recovery of hydrocarbons from the formation to the branched horizontal laterals 1106, 1110, 1114 and ultimately up through vertical well 1102. In the embodiment shown, an exothermic reaction component 1109 has been squeezed into branched horizontal laterals 1106, 1110, 1114 and plurality of fractures 1108, 1112, 1116 to generate heat and pressure via an exothermic reaction. For example, the exothermic reaction component may be used to generate one or more pressure pulses to create fractures and fracture networks, reduce the viscosity of viscous materials (such as heavy oil, asphaltenes, or condensates, for example), reduce the viscosity of residual viscous materials, and, additionally or alternatively, to stimulate hydrocarbon recovery.

Importantly, the foamed material 1103 has been used, in the embodiment shown, to squeeze exothermic reaction component 1109 into branched horizontal laterals 1106, 1110, 1114 and plurality of fractures 1108, 1112, 1116. Foamed material 1103 reduces the hydrostatic pressure at the TVD of L where primary horizontal lateral 1104 is in fluid communication with vertical well 1102. In other words, the pressure required to be generated by the exothermic reaction component 1109 will be less to overcome the hydrostatic pressure with foamed material 1103 to initiate lifting and flowback the well than would be required if standard brine were used in a column of TVD of L in vertical well 1102.

Arrows shown in FIG. 11 denote hydrocarbon flowback toward primary lateral 1104, for example oil and natural gas flowback, generated by exothermic reaction component 1109 once heat and pressure are generated in horizontal laterals 1106, 1110, 1114 and plurality of fractures 1108, 1112, 1116, the exothermic reaction component 1109 having been squeezed into horizontal laterals 1106, 1110, 1114 and plurality of fractures 1108, 1112, 1116 by a subsequent addition via pumping or injection of foamed material 1103.

For example, hydrostatic pressure can be calculated according to the following equation:

Hydrostatic Pressure (psi)=Pressure Gradient (psi/ft.)
*True Vertical Depth (ft.)

In one comparative example, first consider the use of brine to squeeze an exothermic reaction component. Referring to FIG. 11, assuming TVD of L is 12,000 ft. and the pressure gradient of brine is 0.433 psi/ft., then the hydrostatic pressure proximate the point where primary lateral 1104 is in fluid communication with vertical well 1102 would be 5,196 psi, once again, assuming the use of brine. Then, assuming the reservoir pressure is 2,500 psi, the exothermic reaction component would need to generate at least about 2,696 psi in pressure to lift or flow back the well counter the hydrostatic pressure of a brine column.

However, alternatively using a foamed material, such as foamed material 1103 as shown with a pressure gradient of 0.25 psi/ft., then the hydrostatic pressure proximate the point where primary lateral 1104 is in fluid communication with vertical well 1102 would be about 3,000 psi (calculated from 0.25 psi/ft.*12,000 ft.). Then, assuming the reservoir pressure is 2,500 psi, the exothermic reaction component would need to generate only at least about 500 psi in pressure to lift or flow back the well.

Examples of suitable foaming agents include, but are not limited to, alpha-olefin sulfonates, hydroxyethylcellulose, and other suitable surfactants. Foams and foaming agents can be used in combination with or in the absence of brine. In an example method for application, referring to FIG. 11, exothermic reaction component 1109 is not mixed with foam or any foaming agent, at the surface, during injection into vertical well 1102, or after injection into vertical well 1102. In a first step, about 100 barrels of exothermic reaction component can be pumped into vertical well 1102 and subsequently into in horizontal laterals 1106, 1110, 1114 and plurality of fractures 1108, 1112, 1116. In some embodiments, about 50 barrels of an ammonium containing compound, for example 3 molar ammonium chloride, can be injected with about 50 barrels of a nitrite containing compound, for example 3 molar sodium nitrite.

Then in a second step, foamed material 1103 can be injected into vertical well 1102 to squeeze exothermic reaction component 1109 deeper into portions of hydrocarbon-bearing formation 1101. For example, about 100 barrels of a foamed material can be used to squeeze the exothermic reaction component 1109, either used with brine or in the absence of brine. A nitrified fluid may also be used as a foamed material or alternatively with a foamed material. In some embodiments, when a nitrogen gas content is less than about 60% by volume in a fluid, it is referred to as a nitrified fluid rather than a foam.

In some embodiments of methods for wellbore and formation treatment, one or more oxidizers can be pumped into a wellbore, in addition to or alternative to a hydrocarbon-bearing formation, prior to, concurrently with, or subsequent to an exothermic reaction component and any foaming component. Example oxidizers suitable in the present disclosure include, but are not limited to, hydrogen peroxide, sodium hypochlorite, ammonium peroxide, ammonium persulfate, hemicellulose enzyme, and combinations thereof. Such oxidizers can be preceded or followed by injection of an exothermic reaction component, and/or a foamed material, for example a foamed brine solution.

Oxidizers can be pumped through coiled tubing to a specific location in a wellbore or reservoir, and then an exothermic reaction component can be injected to the specific location, either via coiled tubing or via an annulus. In this way, oxidizers increase a local temperature for the exothermic reaction component to be triggered without the addition of an initiator for an exothermic reaction, for example an acid such as acetic acid or hydrochloric acid. Additionally or alternatively, oxidizers can also be pumped into a wellbore proximate a formation by bullheading, or forcibly, with pressure, pumping fluids into a formation itself. Suitable solutions of oxidizers and exothermic reaction components can be mixed on the fly for injection either concurrently, or one before the other, for example via bullheading.

In other embodiments, one or more oxidizers is pumped to a location proximate a wellbore and reservoir to break down a cross-linked gel, for example a viscous fracturing fluid. Oxidizers can be referred to as breakers. After one or more oxidizers is pumped to a location proximate a wellbore and reservoir as a breaker, then an exothermic reaction component is added to increase the reactivity of the one or more oxidizers for more consistent breaking of a viscous material, such as a fracturing fluid.

Using one or more oxidizers preceding an exothermic reaction component allows for the reduction or elimination of the need for catalysts or initiators for an exothermic reaction component, which are typically required at lower temperatures. For example, the use of initiators such as tertiary amines, organic esters, and transition metal salts may be reduced or eliminated.

Although the present disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed here as from about one particular value, or to about another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made here.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method for use of a cleanup fluid in a wellbore disposed in a reservoir, the method comprising the steps of:
    preparing an exothermic reaction component operable to generate heat, and the exothermic reaction component comprising at least one component selected from the group consisting of: urea; sodium hypochlorite; ammonium chloride; ammonium bromide; ammonium nitrate; ammonium sulfate; ammonium carbonate; ammonium hydroxide; sodium nitrite; potassium nitrite; and mixtures thereof,
        where the cleanup fluid comprises only liquid components in solution prepared to be fluidly compatible with a viscous fluid component, the components mixed thoroughly until all components are dissolved, where the cleanup fluid does not include viscifying components at concentrations that generate foam or introduce foam into the wellbore;
    injecting the exothermic reaction component into the wellbore;
    allowing the exothermic reaction component to react in situ to produce heat and nitrogen gas, the heat and nitrogen gas operable to increase temperature and pressure in situ, to create a reduced viscosity material; and
    injecting an oxidizer into the wellbore as a breaker after the step of injecting the exothermic reaction component into the wellbore, where the oxidizer comprises at least one compound selected from the group consisting of: tertiary amines; organic esters; and transition metal salts.

2. The method according to claim 1, further comprising the step of squeezing the exothermic reaction component into a reservoir with a foamed material after the step of injecting the exothermic reaction component into the wellbore.

3. The method according to claim 2, where the exothermic reaction component and foamed material are used in a volume ratio of about 1 to 1.

4. The method according to claim 2, further comprising the step of preparing a foamed brine solution from non-foamed brine to reduce a pressure gradient of the non-foamed brine.

5. The method according to claim 4, where the step of preparing the foamed brine solution reduces hydrostatic pressure of a column of the foamed brine solution by at least about 40% relative to a column of the non-foamed brine of the same size.

6. The method according to claim 4, where the foamed brine solution comprises at least one component selected from the group consisting of: alpha-olefin sulfonates; hydroxyethylcellulose; and combinations thereof.

7. The method according to claim 1, where the exothermic reaction component comprises $NH_4Cl$ and $NaNO_2$.

8. The method according to claim 1, where the exothermic reaction component comprises an ammonium containing compound selected from the group consisting of: ammonium chloride; ammonium bromide; ammonium nitrate; ammonium sulfate; ammonium carbonate; ammonium hydroxide; and mixtures thereof.

9. The method according to claim 8, where the exothermic reaction component comprises a nitrite containing compound selected from the group consisting of: sodium nitrite; potassium nitrite; and mixtures thereof.

10. The method according to claim 1, where the exothermic reaction component comprises at least one ammonium containing compound at about 3 molar (M) concentration and at least one nitrite containing compound at about 3 molar (M) concentration.

11. The method according to claim 1, where the viscous fluid component comprises asphaltenes and corrosion products in the wellbore.

12. The method according to claim 11, where the corrosion products are selected from the group consisting of: iron oxides, iron sulfides, sodium chloride, calcium carbonate, silica, and mixtures thereof.

13. The method according to claim 1, where reducing viscosity of the viscous fluid component to create the reduced viscosity material increases injectivity of the wellbore.

14. The method according to claim 1, further comprising the step of injecting an oxidizer into the wellbore to increase temperature of the wellbore or reservoir before the step of injecting the exothermic reaction component into the wellbore.

15. The method according to claim 14, where the oxidizer comprises at least one compound selected from the group consisting of: tertiary amines; organic esters; and transition metal salts.

16. The method according to claim 1, where the heat reduces a viscosity of the viscous fluid component to create the reduced viscosity material in less than about 1 minute.

17. The method according to claim 1, further comprising the step of preparing an acid precursor, the acid precursor present at a low concentration not greater than about 5% by volume of the cleanup fluid to trigger the exothermic reaction component, in addition to or alternative to heat in the wellbore or reservoir.

18. The method according to claim 17, where the acid precursor comprises at least one component selected form the group consisting of: triacetin; methyl acetate; hydrochloric acid; acetic acid; and mixtures thereof.

* * * * *